United States Patent
Sobolevskiy

(10) Patent No.: US 9,101,877 B2
(45) Date of Patent: Aug. 11, 2015

(54) SELECTIVE CATALYTIC REDUCTION SYSTEM AND PROCESS FOR CONTROL OF $NO_x$ EMISSIONS IN A SULFUR-CONTAINING GAS STREAM

(75) Inventor: Anatoly Sobolevskiy, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 758 days.

(21) Appl. No.: 13/453,013

(22) Filed: Apr. 23, 2012

(65) Prior Publication Data

US 2013/0205743 A1 Aug. 15, 2013

Related U.S. Application Data

(60) Provisional application No. 61/598,010, filed on Feb. 13, 2012.

(51) Int. Cl.
| | |
|---|---|
| *F02C 3/00* | (2006.01) |
| *B01J 23/652* | (2006.01) |
| *B01D 53/58* | (2006.01) |
| *B01D 53/86* | (2006.01) |
| *B01J 35/00* | (2006.01) |
| *B01J 23/22* | (2006.01) |
| *B01J 23/28* | (2006.01) |
| *B01J 23/30* | (2006.01) |

(Continued)

(52) U.S. Cl.
CPC ........ *B01D 53/8628* (2013.01); *B01D 53/9472* (2013.01); *B01J 23/22* (2013.01); *B01J 23/28* (2013.01); *B01J 23/30* (2013.01); *B01J 23/6527* (2013.01); *B01J 35/0006* (2013.01); *F02C 3/28* (2013.01); *B01D 53/9418* (2013.01); *B01D 2251/2062* (2013.01); *B01D 2255/1021* (2013.01); *B01D 2255/1023* (2013.01); *B01D 2255/20707* (2013.01); *B01D 2255/20723* (2013.01); *B01D 2255/20776* (2013.01); *B01D 2255/30* (2013.01); *B01D 2255/9032* (2013.01); *C10J 2300/165* (2013.01); *C10J 2300/1653* (2013.01); *F05D 2220/722* (2013.01); *Y02E 20/16* (2013.01); *Y02E 20/18* (2013.01)

(58) Field of Classification Search
CPC ...... F05D 2220/722; F02C 3/28; B01J 23/30; B01J 23/6527; B01D 53/8628; B01D 53/9418; B01D 2255/20776; B01D 2255/9032; B01D 53/9472; B01D 53/565

See application file for complete search history.

(56) References Cited

U.S. PATENT DOCUMENTS

| | | | |
|---|---|---|---|
| 5,137,855 A | 8/1992 | Hegedus et al. | |
| 5,658,546 A * | 8/1997 | Kobayashi et al. | 423/239.1 |

(Continued)

FOREIGN PATENT DOCUMENTS

| | | | | |
|---|---|---|---|---|
| CA | 2729953 A1 * | 4/2011 | ............... | B01J 23/30 |
| CA | 2847671 A1 * | 3/2013 | ............... | B01J 38/64 |

(Continued)

*Primary Examiner* — Timothy Vanoy

(57) ABSTRACT

An exhaust gas treatment process, apparatus, and system for reducing the concentration of NOx, CO and hydrocarbons in a gas stream, such as an exhaust stream (29), via selective catalytic reduction with ammonia is provided. The process, apparatus and system include a catalytic bed (32) having a reducing only catalyst portion (34) and a downstream reducing-plus-oxidizing portion (36). Each portion (34, 36) includes an amount of tungsten. The reducing-plus-oxidizing catalyst portion (36) advantageously includes a greater amount of tungsten than the reducing catalyst portion (36) to markedly limit ammonia salt formation.

20 Claims, 1 Drawing Sheet

(51) Int. Cl.
*F02C 3/28* (2006.01)
*B01D 53/94* (2006.01)

(56) References Cited

U.S. PATENT DOCUMENTS

| | | | |
|---|---|---|---|
| 6,033,641 A * | 3/2000 | Hall et al. | 423/239.2 |
| 7,390,471 B2 | 6/2008 | Sobolevskiy et al. | |
| 7,393,511 B2 | 7/2008 | Tran et al. | |
| 7,695,703 B2 | 4/2010 | Sobolevskiy et al. | |
| 7,718,153 B2 | 5/2010 | Sobolevskiy et al. | |
| 7,727,499 B2 | 6/2010 | Liu et al. | |
| 7,744,840 B2 | 6/2010 | Sobolevskiy et al. | |
| 7,825,060 B2 * | 11/2010 | Hikazudani et al. | 502/200 |
| 7,976,805 B2 | 7/2011 | Sobolevskiy et al. | |
| 7,988,940 B2 | 8/2011 | Sobolevskiy et al. | |
| 8,505,285 B2 * | 8/2013 | Winkler et al. | 60/303 |
| 8,722,559 B2 * | 5/2014 | Nochi et al. | 502/56 |
| 2007/0092421 A1 | 4/2007 | Hancu et al. | |
| 2007/0110643 A1 | 5/2007 | Sobolevskiy et al. | |
| 2008/0299016 A1 | 12/2008 | Sobolevskiy et al. | |
| 2009/0143225 A1 | 6/2009 | Ha et al. | |
| 2010/0300061 A1 | 12/2010 | Sobolevskiy et al. | |
| 2010/0303697 A1 | 12/2010 | Sobolevskiy et al. | |

FOREIGN PATENT DOCUMENTS

| | | | |
|---|---|---|---|
| DE | 102010040808 A1 * | 3/2012 | B01J 23/652 |
| EP | 0410440 A1 | 1/1991 | |
| EP | 0611594 A1 | 8/1994 | |
| EP | 2116293 A1 | 11/2009 | |
| WO | 2008016627 A1 | 2/2008 | |
| WO | WO 2013099253 A1 * | 7/2013 | B01J 23/30 |

* cited by examiner

SELECTIVE CATALYTIC REDUCTION SYSTEM AND PROCESS FOR CONTROL OF $NO_x$ EMISSIONS IN A SULFUR-CONTAINING GAS STREAM

This application claims benefit of the 13 Feb. 2012 filing date of U.S. Provisional Application No. 61/598,010, the entirety of which is hereby incorporated by reference.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to processes and systems for the reduction of nitrogen oxides ($NO_x$) in combustion exhaust by selective catalytic reduction (SCR) using ammonia ($NH_3$) as a reducing agent. The present invention also relates to the field of power generation and more particularly to the control of $NO_x$ emissions and ammonium salt formation in exhaust gas from the burning of a fuel containing hydrogen to generate power, such as from a gas turbine at a coal gasification plant. However, the present invention may also be employed in $NO_x$ abatement from other sources, such as emissions generated during manufacture of nitric acid, within internal combustion engines, and the like.

BACKGROUND OF THE INVENTION

Coal-based integrated gasification combined cycle plant (IGCC) technology enables production of electricity with a gas turbine utilizing a fuel that is rich in hydrogen and CO, and has a very limited amount of $CO_2$. Combustion of the fuel requires an oxidizing source such as air, which contains nitrogen ($N_2$). As a result, a by-product in exhaust gas stemming from hydrogen-containing fuel combustion is a significant amount of $NO_x$ and certain amounts of CO and $SO_2$. During start up of an IGCC plant and also during the downtime of a gasifier, the IGCC plant is operating by using natural gas fuel. As a result, the combustion exhaust contains $NO_x$, CO and hydrocarbons. $NO_x$ in the exhaust gas may be reduced by using selective catalytic reduction (SCR) systems along with low $NO_x$ combustors in the gas turbine. SCR is a very efficient NOx control device, especially when ammonia is used as a reducing agent.

In such systems, selective catalytic reduction is done by mixing the exhaust gas with anhydrous ammonia and passing the exhaust gas over a suitable reduction catalyst at temperatures between 150-550° C. prior to being released into the atmosphere. The ammonia is not a natural part of the combustion exhaust stream, but rather is injected into the exhaust stream upstream of the catalyst element for the specific purpose of supporting one or more of the following reduction reactions:

$$4NH_3 + 4NO + O_2 \rightarrow 4N_2 + 6H_2O \quad (1)$$

$$4NH_3 + 2NO + 2NO_2 \rightarrow 4N_2 + 6H_2O \quad (2)$$

$$8NH_3 + 6NO_2 \rightarrow 7N_2 + 12H_2O \quad (3)$$

$$2NH_3 + NO + NO_2 \rightarrow 2N_2 + 3H_2O \quad (4)$$

Reducing agents other than ammonia, such as for example hydrazine, methyl hydrazine, monomethyl amine, and urea, or mixtures thereof, or mixtures thereof with ammonia, may also be employed.

As mentioned above, it is also well known that IGCC exhaust includes elevated amounts of $SO_2$. Commercial processes such as the Rectisol® process (licensed by both Linde AG and Lurgi AG), Selexol (now licensed by UOP LLC), and the like, can remove more than 97% of the sulfur from the subject gas. Still, the concentration of sulfur can be up to 20 ppm. Taking into consideration dilution with nitrogen, the concentration of $SO_2$ in IGCC gas turbine exhaust can be at the level of 5 to 10 ppm. After $CO_2$ sequestration and the burning of $H_2$-fuel, concentrations of $H_2O$ in the exhaust can be as high as 20-25 vol. % and oxygen content can reach 10-18 vol. %. Under these conditions, developing a fuel flexible process to reduce $NO_x$, CO, and hydrocarbon emissions is very challenging.

Critically, high sulfur content in the exhaust gas promotes the following reactions with excess of ammonia (ammonia slip), especially in the presence of high water concentrations:

$$NH_3 + SO_2 + H_2O \rightarrow \tfrac{1}{2}O_2 \rightarrow NH_4HSO_4 \quad (5)$$

$$2NH_3 + SO_2 + H_2O \rightarrow \tfrac{1}{2}O_2 \rightarrow (NH_4)_2SO_4 \quad (6)$$

Formation of these undesirable ammonia salts, especially ammonia bisulfates (hereinafter "ABS"), may lead to severe corrosion of the heat exchange elements downstream of SCR. Furthermore, the salts may cause secondary pollution of $PM_{2.5}$, which is an aerosol or mist of ammonia salts.

BRIEF DESCRIPTION OF THE DRAWINGS

The invention is explained in the following description in view of the drawings that show.

DETAILED DESCRIPTION OF THE INVENTION

The present inventor has surprisingly found that a catalyst system having a reducing only portion and a downstream second reducing-plus-oxidizing portion having a greater amount of tungsten as described below ideally decreases the formation of ABS in the exhaust stream. This reduced ABS formation occurs even in the presence of 5-20 ppm of $SO_2$, 10-18 vol. % of $O_2$ and up to 20-25 vol. % of water. In one aspect of the present invention, the reducing only portion and the downstream reducing-plus oxidizing portion each include an amount of tungsten, such as by a tungsten oxide, e.g., tungsten (VI) oxide ($WO_3$). The term "tungsten oxide" as used herein will refer to any oxide of tungsten, including but not limited to its various oxidation states. The additional amount of tungsten in the reducing-plus oxidizing portion of the catalyst system relative to the reducing only portion results in a substantial reduction in the amount of ABS formed in the subject gas stream being treated.

Figure 1:
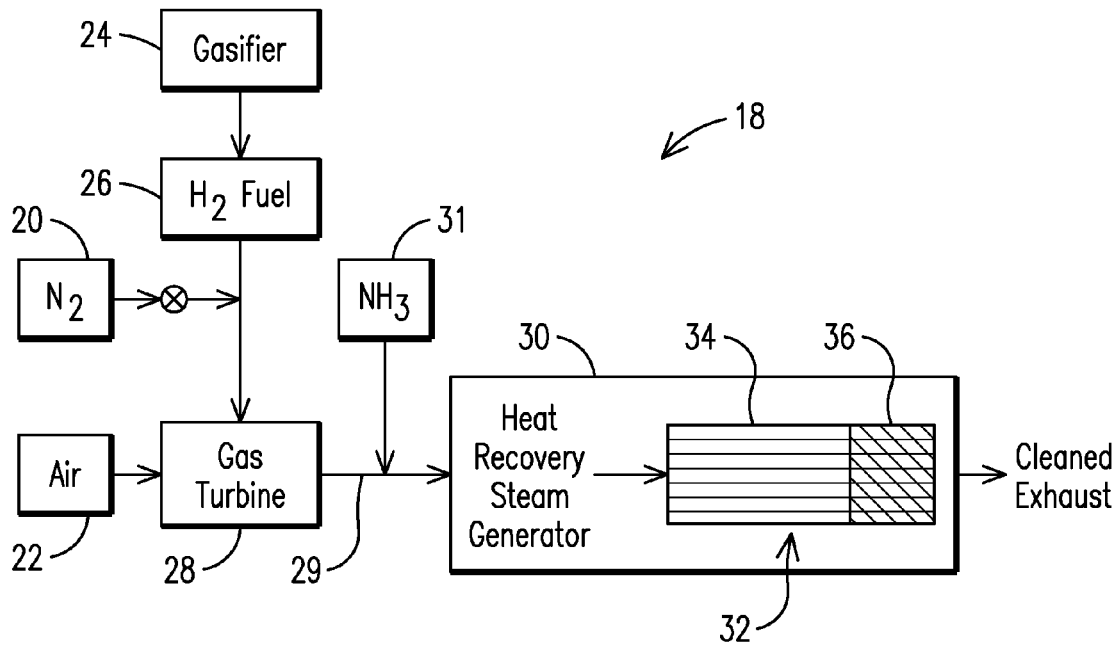
FIG. 1 is a schematic view of an integrated gasification combined cycle power plant system in accordance with an aspect of the present invention.

Now referring to the figures, FIG. 1 illustrates an integrated gasification combined cycle power plant system 18 that produces an $H_2$-containing fuel 26 (syngas, or $H_2$-rich fuel after $CO_2$ capture) using a gasification process at gasifier 24. The $H_2$-containing fuel 26 may be diluted with nitrogen 20 and combined with air 22 as shown for combustion in a gas turbine 28. In one embodiment, the system 18 or gasifier 24 produces an $H_2$-containing fuel 26 containing at least 10 vol. % $H_2$ and at least 10 vol. % $N_2$. Turbine exhaust gas 29 is directed to a heat recovery steam generator (HRSG) 30, which includes or is otherwise located upstream of a catalyst or catalytic element or bed, e.g., a Polyfunctional Emission Reduction Catalytic System bed (catalytic bed or PERCW bed 32). Typically, the catalytic bed 32 is positioned at a location suitable for a desired SCR temperature operating range, which may be 100-500° C., and in a particular embodiment is 250-300° C. As shown, the exhaust gas 29 passes to the catalytic bed 32. Upstream from the catalytic bed 32, there is typically an ammonia injection apparatus 31 for introducing an amount of ammonia into the exhaust gas 29. The catalytic bed 32 comprises a catalyst system having a reducing only portion 34 and a reducing-plus-oxidizing portion 36 downstream from the reducing only portion. Optionally, a water injection system (not shown) may be used to improve $NO_x$ reduction reactions within the catalytic bed 32. Optionally also, one or more controllers may be connected to sensors and valves (not shown) throughout the system 18 to sense and control the process as is necessary or desired.

In one embodiment, the catalytic bed 32 is in a geometric form that allows for high contaminant removal efficiency along with a minimal pressure drop. Although beads, extrudates, pellets, granules, cylinders, and the like are suitable geometric forms employed in commercial applications, a monolith is a preferred form. The monolithic form and the use of a monolith as a catalyst carrier are well known to one skilled in the art. A monolith consists of a series of straight, non-interconnecting channels. Onto the walls of the monolith are coated a thin layer of a catalyst-containing material, termed "washcoat" in the art. It is within the pores of the washcoat that the catalytically active component(s), binder(s), supporter(s), and promoter(s) (if present) are located. Thus, in one embodiment, a honeycomb monolith may be washcoated with any catalyst system described herein. It is appreciated that the reducing only portion 34 and the reducing-plus-oxidizing portion 36 may be formed as a monolithic structure, or the two portions may be formed separately.

The reducing only portion 34 of the catalytic bed 32 comprises one or catalytic components that promotes the reduction of NOx by a $NH_3$ reducing agent, thereby producing primarily $N_2$ and $H_2O$. In the presence of oxygen, the reaction may proceed, for example, as follows:

$$4NO+4NH_3+O_2 \rightarrow 4N_2+6H_2O \qquad (7)$$

$$2NO_2+4NH_3+O_2 \rightarrow 3N_2+6H_2O \qquad (8)$$

The material or materials selected for the reducing only portion 34 may include any appropriate material known in the art, such as supporters, binders, promoters and catalytic or active components to prepare a catalyst system for the reduction of $NO_x$. In one embodiment, the catalytic material(s) include tungsten and one or more of vanadium, molybdenum, silicon or silicates, alumina, aluminum, iron, titania, zirconia, titania-zirconia, magnesium, manganese, yttrium, or their mixtures, for example. The tungsten is typically provided by or as part of a tungsten compound such as tungsten oxide, e.g., tungsten (IV) oxide or $WO_3$. Other or additional additives, such as sulfate, lanthanum, barium, zirconium, may also be present. The reducing only portion 34 may also include a zeolite-based material. Zeolite-based catalytic materials include acidified forms of zeolite ZSM-5, zeolite beta, mortenite, and faujasite that are promoted with small amounts of base metals, such as for example iron, cobalt and nickel. Typically, titanium oxides, silicates, zirconia and/or alumina are used as supporters for the reducing only portion 34 or the reducing-plus-oxidizing portion 36 (described below).

In one embodiment, the reducing only portion 34 of the catalytic bed 32 comprises a mixture of tungsten oxide and at least one component selected from the group consisting of titanium dioxide, vanadium pentoxide, silicon, molybdenum, magnesium, aluminum, yttrium, and combinations thereof. In a particular embodiment, the reducing only portion 34 and the reducing-plus-oxidizing portion 36 each further comprise vanadium pentoxide and titanium dioxide (in addition to the tungsten oxide). For example, an exemplary composition (by wt. %) for use in the present invention is 1-2 wt. % V/7-10 wt. % W/35-40 wt. % Ti. In the reducing only portion 34, the tungsten may be provided in a range of 5-15 wt. % of the catalytic bed 32.

The reducing-plus-oxidizing portion 36 is typically located downstream of the reducing only portion 34 and is composed to complete reactions for $NO_x$ removal, reduce CO and hydrocarbons emissions, as well as to minimize ammonia slip. Critically, the reducing-plus-oxidizing portion 36 is characterized by an increased amount of tungsten relative to the reducing only portion 34. The additional tungsten similarly is typically provided by or as part of a tungsten compound such as tungsten oxide, e.g., tungsten (IV) oxide or $WO_3$. It is understood that the separation of the reducing only portion 34 and the reducing-plus-oxidizing portion 36 may not fully be distinct, but the catalytic bed 32 will be characterized as having a greater concentration of tungsten at a downstream end relative to an upstream portion of the catalytic bed 32.

The reducing-plus-oxidizing portion 36 may comprise any of the material(s) that support the reduction reactions described above for the reducing only portion 34, as well as material(s) that support one or more of the following oxidizing reactions:

$$CO+O_2 \rightarrow CO_2 \qquad (9)$$

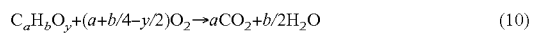
$$C_aH_bO_y+(a+b/4-y/2)O_2 \rightarrow aCO_2+b/2H_2O \qquad (10)$$

$$4NH_3+7O_2 \rightarrow 4NO_2+6H_2O \qquad (11)$$

$$4NH_3+5O_2 \rightarrow 4NO_2+6H_2O \qquad (12)$$

$$2NH_3+2O_2 \rightarrow 4N_2O+3H_2O \qquad (13)$$

$$4NH_3+3O_2 \rightarrow 2N_2+6H_2O \qquad (14)$$

In one embodiment, the reducing-plus-oxidizing portion 36 preferably supports reaction (10) and/or (14) over reactions (11-13) in order to minimize the production of additional quantities of $NO_R$. Thus, an oxidizing catalyst material of the reducing-plus-oxidizing portion 36 may be provided to decompose $NH_3$ to primarily $N_2$. Exemplary oxidizing catalyst materials include, but are not limited to, copper, platinum, palladium, chromium, iron, nickel, rhodium, gold, silver, ruthenium and mixtures thereof, although the present invention is not limited to any particular oxidizing catalytic material. In one embodiment, the reducing-plus-oxidizing portion comprises at least one platinum group metal. The oxidizing catalyst may comprise from 1-10 g/ft³ of the platinum group metal, for example.

The present inventor has particularly found that the presence of an additional amount of tungsten in the reducing-plus-oxidizing portion 36 of the catalytic bed 32 substantially decreases formation of ABS within and downstream of the catalytic bed 32. Critically, reduced ABS formation occurs even in the presence of up to 20 ppm of $SO_2$, 10-18 vol. % $O_2$ and up to 20-25 vol. % of water, which are typically conditions that promote the conversion of $SO_2$ to $SO_3$. When $SO_3$ is formed and found in the exhaust gas 29, the $SO_3$ may react with any slipped ammonia in the exhaust gas 29 to produce the extremely undesirable ABS. Aspects of the present invention substantially minimize production of undesirable ABS while still reducing and oxidizing the undesirable pollutants in the gas stream, including NOx, CO, hydrocarbons, and ammonia.

In one embodiment, the reducing-plus-oxidizing portion 36 comprises an additional 2-8 wt. % of tungsten relative to the reducing only portion 34, and in a particular embodiment an additional 3-6 wt. %. In this way, in the reducing-plus-oxidizing portion 36, tungsten may be provided in a range of from 7-23 wt. % of the catalytic bed 32 in the reducing plus oxidizing portion 36. In a particular embodiment, tungsten is provided in the range of from 10-16 wt. % in the reducing-plus-oxidizing portion 36. Therefore, the total amount of tungsten in the catalytic bed 32 may comprise from 12-38 wt. % tungsten. The weight percentages provided herein (wt. %) described for the reducing only portion 34 and reducing-plus-oxidizing portion 36 are relative to the materials of the catalytic bed 32 as a whole unless otherwise noted.

The inclusion of the tungsten within the catalytic bed 32 may be done according to any known method in the art, such as by impregnation with ammonium tungstate and drying. The types, volumes and structure of the catalytic materials of the catalytic bed 32 may vary depending upon the requirements of a particular application. The reducing only portion 34 of the multi-function catalyst may be in the range of 10-90% of the total catalyst volume of the catalytic bed 32. In a particular embodiment, the reducing only portion 34 is 60% of the total volume of the catalytic bed 32 and the reducing-plus-oxidizing portion 36 is 40% of the total catalyst volume of the catalytic bed 32.

Although the above invention was described in the context of the power generation field, with specific emphasis on the treatment of gas turbine exhaust, the novel process as described herein may be applied to other $NO_x$ pollution sources, such as for example nitric acid plants and stationary emissions sources, with different system configurations. The below examples are provided to illustrate certain aspects of the present invention and are not intended to be limiting in any respect.

Example 1

The following is an example of catalyst preparation with additional amount of tungsten (W) in the reducing-plus-oxidizing portion 36. A solution was prepared by adding ammonium metatungstate (Aldrich) to DI water in a 2000 mL beaker. The monolith cores of a extruded conventional SCR catalyst system with 7% by wt. tungsten were dipped in the solution to achieve a 10% by wt. tungsten loading. Blocks were microwave dried and calcined at 450° C. for 2 hours. A palladium/platinum metal solution was prepared by adding to a beaker tetraammine palladium chloride solution and a solution of tetraammine platinum chloride. Monolith blocks were dipped in said solutions yielding an average of 5 g Pt Pd/ft$^3$. Blocks were further microwaved, dried and calcined at 450° C. for 2 hours to provide a PERCW catalyst bed that includes tungsten oxide after calcination. It is appreciated that the catalyst beds described herein may thus be provided by adding tungsten and an oxidizing catalyst, e.g. platinum or palladium, in amounts specified herein to a known SCR catalyst system or formulation thereof, such as that disclosed in U.S. Pat. No. 7,390,471, the entirety of which is incorporated by reference herein.

Example 2

As shown in Table 1, the present inventor found that the presence of an additional amount of tungsten in a conventional industrial SCR (baseline comparative catalyst) did not lead to any significant changes in the catalyst performance with regard to formation of ABS (Table 1). The baseline SCR comparative catalyst (SCR) had the following composition: 1.6% V/7% W/3.0% Si/36.5% Ti. The SCR+3.5% W catalyst system shown in Table 1 included an additional $WO_3$ (additional 3.5 wt % tungsten). The inclusion of the additional $WO_3$ in the SCR catalytic bed did not lead to any significant changes in the catalyst performance with regard to the formation of ABS. In the PERC catalyst system, the reducing only portion 34 of the PERC bed had the same as baseline SCR composition, but a reducing-plus-oxidizing portion 36 of the PERC catalyst was provided and had a baseline SCR composition with addition of 5 g/ft$^3$ Pd and 5 g/ft$^3$ Pt. In the PERCW catalyst system, there was provided an additional 3.5 wt. % of W. As can be seen, the inclusion of an additional 3.5 wt. % W in the reducing-plus-oxidizing portion 36 of the PERCW catalyst system substantially reduced ABS formation.

Operating Conditions: GHSV—20,000 hr$^{-1}$, $NH_3$:NOx Molar Ratio—1-1.08, $SO_2$—2 ppm, $H_2O$—20%, Temperature 320° C.

TABLE 1

| Catalyst | NOx Removal, % | ABS, Relative Fraction |
|---|---|---|
| SCR | 98 | 1.000 |
| SCR with additional 3.5% W | 97 | 0.985 |
| PERC | 97 | 2.025 |
| PERCW with additional 3.5% W | 97 | 0.688 |

Example 3

Figure 2:
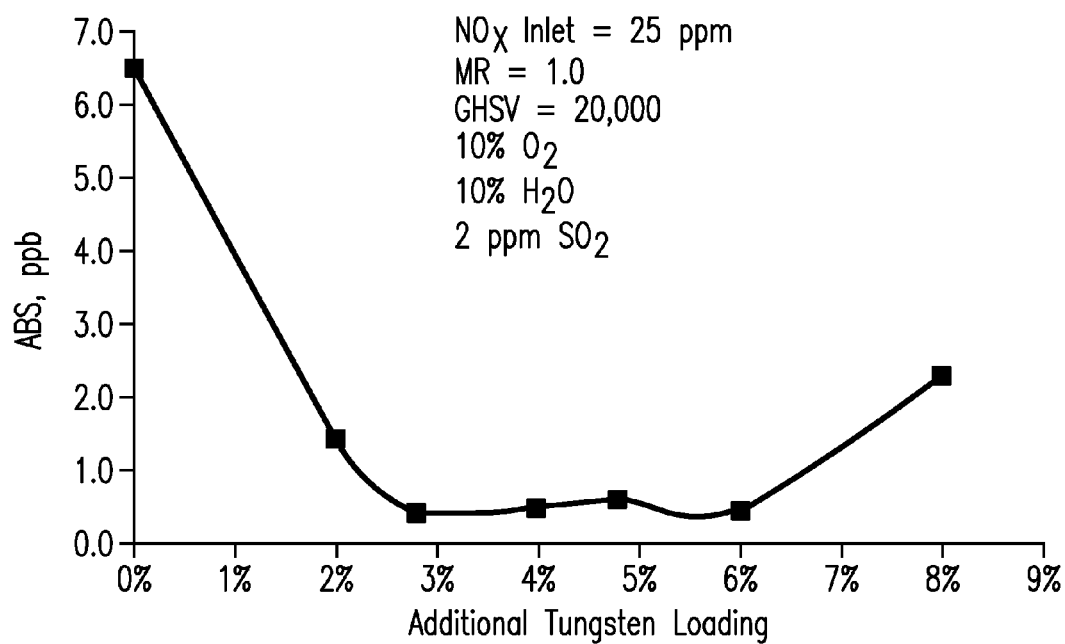
FIG. 2 is a graph showing ABS concentration (ppb) as a function of tungsten loading

The inventor has found that including the additional tungsten in the downstream reducing-plus-oxidizing portion resulted in a substantial decrease in ABS formation at particular concentrations. As shown in FIG. 2 and Table 2, for example, the present inventor has found that by providing an additional 2-8 wt. % of tungsten in the downstream reducing-plus-oxidizing portion 36 relative to the reducing only portion 34 resulted in a marked drop in ABS formation (below 2.0 ppb ABS and typically below 1.0 ppb) relative to a uniform distribution of tungsten throughout the catalytic bed 32. Exemplary results of catalysts were tested under IGCC operating conditions in the pilot scale testing rig (catalytic block 150× 150×300 mm) and are illustrated in Table 2 below. In this instance, the baseline SCR comparative catalyst (SCR in Table 2) had the following composition: 1.6% V/7.2% W/3.0% Si/36.5% Ti. The reducing only portion 36 of the catalytic bed 32 had the same as baseline SCR composition while the reduction-plus-oxidizing portion 36 of the catalytic bed 32 had a baseline SCR composition with the addition of 5 g/ft$^3$ Pd and 5 g/ft$^3$ Pt.

The improved PERC (PERCW) composition also had an additional 3.5 wt. % (by wt. % of the catalyst system as a whole) of tungsten by way of $WO_3$ in the reducing-plusoxidizing portion 36 relative to the reducing only portion 34. In the experimental conditions shown in Table 2 and FIG. 2, the split between the reducing only portion 34 and the reducing-plus-oxidizing portion 36 in the PERCW catalyst system was 60:40 vol. %. As shown in FIG. 2 the optimum percentage of additional W that is included, e.g., impregnated, into the reducing-plus-oxidizing portion 36 of the catalytic bed 32 in order to reduce amount of ABS was within a range of 3-6 wt. %, thereby achieving a total percentage of W in the reducing-plus-oxidizing portion of 10-16 wt. %.

Operating Conditions: GHSV—20,000 hr$^{-1}$, NH$_3$/NOx Molar Ratio—1-1.1, H$_2$O—20%, Temperature 320° C.

TABLE 2

| Catalyst | NOx Removal, % | CO Removal, % | NH$_3$ slip, ppm | ABS, Relative Fraction |
|---|---|---|---|---|
| SCR | 97.3-98.8 | — | 2.3 | 1.00 |
| PERCW | 97.5-97.7 | 96 | 0.19 | 0.515 |

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for selective catalytic reduction of nitrogen oxides (NOx) with effective suppression of ammonia salt formation in a gas stream comprising ammonia, the NOx, SO$_2$ and water, the process comprising:
    reducing the NOx via the ammonia by passing the gas stream over a catalytic bed comprising a reducing only catalyst portion that comprises a first amount of tungsten; and
    oxidizing remaining ammonia while simultaneously further reducing NOx by passing the gas stream over a reducing-plus-oxidizing catalyst portion downstream from the reducing only catalyst portion in the catalytic bed, the reducing-plus-oxidizing catalyst portion comprising a second amount of tungsten greater than the first amount of tungsten.

2. The process of claim 1, wherein the reducing only catalyst portion and the reducing-plus-oxidizing catalyst portion each further comprise vanadium pentoxide and titanium dioxide.

3. The process of claim 1, wherein the reducing-plus-oxidizing catalyst portion further comprises an amount of at least one platinum group metal effective to promote oxidizing reactions.

4. The process of claim 1, wherein the second amount of tungsten is from 2-8 wt. % of the catalytic bed greater the first amount of tungsten.

5. The process of claim 4, wherein the second amount of tungsten is from 3-6 wt. % of the catalytic bed greater than the first amount of tungsten.

6. The process of claim 1, wherein a total amount of the first amount of tungsten and the second amount of tungsten is from 12-38 wt. % of the catalytic bed.

7. The process of claim 1, wherein a total amount of the tungsten in the reducing-plus-oxidizing catalyst portion is 10-16 wt. % of the catalytic bed.

8. The process of claim 1, wherein a ratio of the reducing catalyst portion to the reducing-plus-oxidizing catalyst portion is 60:40 by vol. % of the catalytic bed.

9. The process of claim 1, further comprising providing the reducing only catalyst portion and the reducing-plus-oxidizing portion on a common monolithic substrate.

10. The process of claim 1, wherein the gas stream comprises from 10-25 vol. % water, 5-18 vol. % O$_2$ and 5-20 ppm of SO$_2$.

11. The process of claim 1, wherein the first amount of tungsten and the second amount of tungsten are provided by tungsten oxide.

12. The process according to claim 1, further comprising installing the catalytic bed in a flow path of an exhaust gas stream of a gas turbine, wherein the exhaust gas stream includes NO$_x$, CO, hydrocarbons, H$_2$O, O$_2$, and SO$_2$.

13. The process according to claim 9, further comprising installing the catalytic bed in a flow path of an exhaust gas stream of a gas turbine in an integrated gasification combined cycle (IGCC) power generation plant that synthesizes a hydrogen-containing fuel for the gas turbine.

14. A catalytic bed for selective catalytic reduction of nitrogen oxides (NOx) with effective suppression of ammonia salt formation in a gas stream comprising at least ammonia, NO$_x$, SO$_2$ and water, the catalytic bed comprising:
    a reducing only catalyst portion that comprises a first amount of tungsten for reducing the NO in the gas stream; and
    a reducing-plus-oxidizing catalyst portion downstream from the reducing only catalyst portion in the catalytic bed for oxidizing remaining ammonia while simultaneously further reducing NO$_x$, the reducing-plus-oxidizing catalyst portion comprising a second amount of tungsten greater than the first amount of tungsten.

15. The catalytic bed of claim 14, wherein the reducing-plus-oxidizing portion further comprises an amount of at least one platinum group metal effective to promote oxidizing reactions, wherein the second amount of tungsten is from 2-8 by wt. % of the catalytic bed greater the first amount of tungsten.

16. The catalytic bed of claim 14, wherein the second amount of tungsten is from 3-6 by wt. % of the catalytic bed greater the first amount of tungsten.

17. The catalytic bed of claim 16, wherein the first amount and the second amount of tungsten are from tungsten oxide.

18. The catalytic bed of claim 14, wherein a total amount of the first amount of tungsten and the second amount of tungsten is from 12-38 wt. % of the catalytic bed.

19. The catalytic bed of claim 14, wherein a ratio of the reducing only catalyst portion to the reducing-plus-oxidizing portion is 60:40 by vol. % of the catalytic bed.

20. A power generating apparatus comprising
    a gas turbine engine for combusting a fuel in air to produce shaft power and a flow of an exhaust gas comprising oxides of nitrogen (NOx), carbon monoxide and hydrocarbons; and
    a treatment apparatus for receiving the exhaust gas prior to passing the exhaust gas to the atmosphere, the treatment apparatus comprising the catalytic bed of claim 14.

* * * * *